A. GUYOT.
CONTINUOUS PROCESS FOR THE PREPARATION OF MONOCHLORACETIC ACID STARTING FROM TRICHLORETHYLENE.
APPLICATION FILED SEPT. 21, 1918.
1,322,898. Patented Nov. 25, 1919.
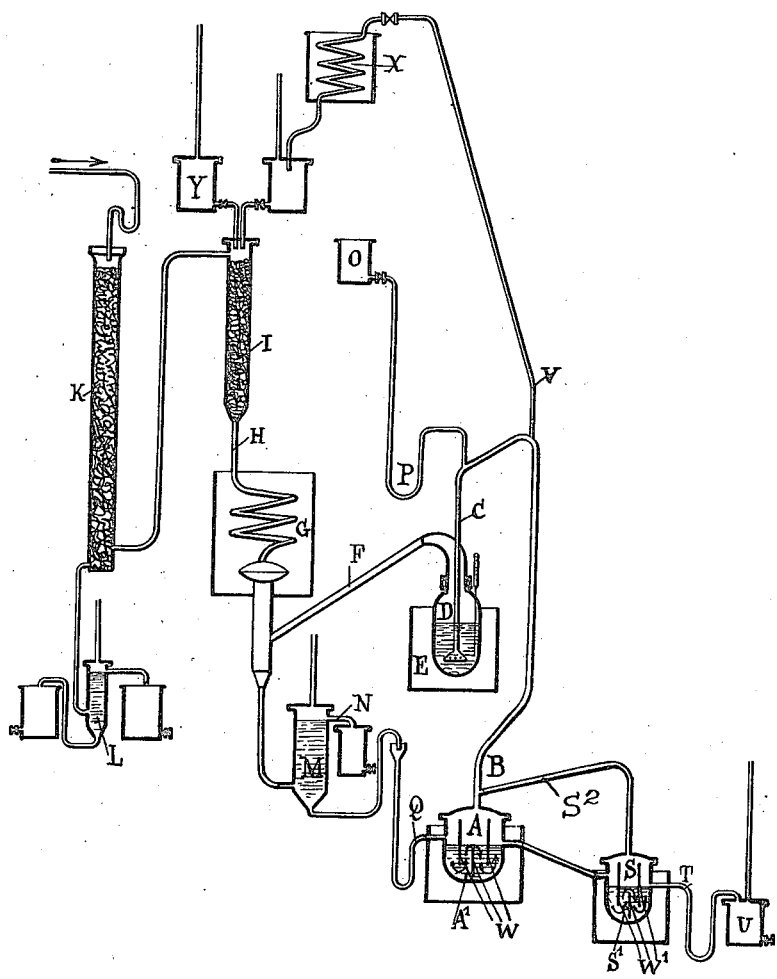
INVENTOR
ALFRED GUYOT
BY Johnson and Johnson
ATTORNEYS.

UNITED STATES PATENT OFFICE.

ALFRED GUYOT, OF SALINDRES, FRANCE, ASSIGNOR TO COMPAGNIE DES PRODUITS CHIMIQUES D'ALAIS ET DE LA CAMARGUE, OF PARIS, FRANCE, A CORPORATION OF FRANCE.

CONTINUOUS PROCESS FOR THE PREPARATION OF MONOCHLORACETIC ACID STARTING FROM TRICHLORETHYLENE.

1,322,898.      Specification of Letters Patent.      Patented Nov. 25, 1919.

Application filed September 21, 1918. Serial No. 255,182.

*To all whom it may concern:*

Be it known that I, ALFRED GUYOT, a citizen of the Republic of France, and a resident of Salindres, Department of Gard, France, have invented new and useful Improvements in Continuous Processes for the Preparation of Monochloracetic Acid Starting from Trichlorethylene, of which the following is a specification.

It is known that when a current of vapor of trichlorethylene is passed into hot and sufficiently diluted sulfuric acid, the water which is contained in this acid is progressively carried over by the vapor from the chlorinated compound which does not undergo any alteration; there is simply concentration of the acid.

It has already been ascertained also, following up this discovery, that starting from a certain concentration of the acid, about 90%, the water which is still contained by the acid is no longer carried over but reacts upon the trichlorethylene in conformity with the equation:

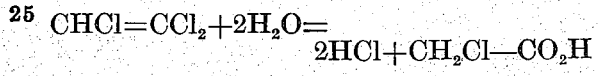
$$CHCl=CCl_2+2H_2O=2HCl+CH_2Cl-CO_2H$$

that is to say with the formation of two molecules of hydrochloric acid and one molecule of monochloracetic acid.

However, it would be difficult to make use of this observation to prepare industrially large quantities of chloracetic acid, because the small quantity of water afforded by the sulfuric acid at 90% would necessitate apparatus of very large capacity, whereas the nature of the substances employed and of the products formed in the reaction (sulfuric acid, hydrochloric acid and chloracetic acid) requires for the construction of these apparatus the use of materials which are not attacked by acids and are relatively rare.

Now, continuing the study of this reaction, I have discovered that with a given quantity of sulfuric acid, I can change a practically unlimited quantity of trichlorethylene into monochloracetic acid on condition:—

(1) The concentration of the acid is maintained by the addition of water, within the limits in which it is capable of causing the reaction, and (2) The chloracetic acid is eliminated proportionately to its formation by causing an excess of trichlorethylene to bubble into the reaction liquid, this excess being greater as the working temperature is lower.

Taking account of these observations, I have worked out a continuous process for the preparation of the chloracetic acid, which process can be carried out in any suitable apparatus.

The accompanying drawing represents schematically in broken vertical elevation, an illustrative apparatus in which the process may be successfully carried out.

The boiler A, in which are arranged baffles W, is heated by an oil bath A' to a temperature at which the trichlorethylene contained therein is evaporated. The boiler A is connected by pipes B—C to a receptacle D containing sulfuric acid and heated by furnace E. The pipe F connects this receptacle to a reflux condenser G, the coil of which opens at one end to the bottom of a washing tower I, filled with fragmentary material which affords a large contact surface and through which constantly percolates pure trichlorethylene. The tower I is connected near its upper end to the lower portion of a second washing tower K, through which constantly percolates cold water. A decanter L is connected to the lower end of column K. The coil of the reflux condenser G is connected at its lower end to a decanter M, from which the pipe Q leads to the boiler A. The latter is furthermore connected with a second boiler S, baffled at W', heated by an oil bath S' and connected by pipe T to a collector U.

The vapors of trichlorethylene rising from the boiler A, pass through B—C into the sulfuric acid contained in the heated receptacle D. The vapors and gas which escape therefrom comprise essentially a mixture of hydrochloric acid, trichlorethylene, chloracetic acid and a little steam. These pass through the tube F to the reflux condenser G. The hydrochloric acid gas escapes through H, carrying with it, although quite cold, considerable quantities of chloracetic acid and trichlorethylene. It is completely deprived of chloracetic acid by its passage through the washing tower I, in which it contacts with the pure trichlorethylene percolated therethrough.

The dry hydrochloric acid gas, saturated with trichlorethylene from the first washing tower I, passes into the second washing tower K, through which cold water percolates. Here the hydrochloric acid is dissolved and the trichlorethylene is condensed, the latter being separated from the hydrochloric acid and completely recovered.

The liquid condensed in the reflux condenser G mixes with the liquid discharged from the washing tower I, and forms a mixture of chloracetic acid, trichlorethylene and a little water. It passes to the decanter M where the water separates and automatically flows off through the pipe N. This water, which is of course heavily charged with mono-chloracetic acid, is mixed in the receptacle O with the water constantly introduced into the apparatus through pipe D to maintain constant the concentration of the sulfuric acid.

The liquid separated from the water and constituting solely a solution of chloracetic acid in trichlorethylene, returns to the boiler A by the pipe Q. The trichlorethylene is there vaporized and reënters the general circuit of the apparatus by the pipes B—C, while the chloracetic acid passes into the second boiler S, in which it is freed from the little trichlorethylene which it may still contain and which reënters the general circuit by the pipe $S^2$. The chloracetic acid flows out continually through the pipe T with the collector U, where it is recovered.

A connection V opening to the pipes B—C serves to feed the washing tower I with trichlorethylene through the condenser X.

A supplemental feed of trichlorethylene from Y maintains constant the quantity thereof in circulation through the apparatus.

It has been recognized that the temperature, at which it is convenient to work in order to carry out the process intended, may vary within considerable limits. The formation of chloracetic acid is already determined at a temperature below 160° C. and it still continues, without appreciable secondary reactions, above 190° C.

Having now particularly described and ascertained the nature of my said invention and in what manner the same is to be performed, I declare that what I claim is:—

A continuous process for the preparation of monochloracetic acid by the action of trichlorethylene upon sulfuric acid of at least 90% concentration consisting in maintaining the concentration of the sulfuric acid, by the addition of water, within the limits in which it is capable of causing the reaction and in eliminating the chloracetic acid proportionately to its formation from the medium in which it is formed, by a current of vapor of trichlorethylene.

In testimony whereof I have signed my name to this specification.

ALFRED GUYOT.

Witnesses:
    CHARLES DONIT,
    M. DEFEVREMONT.